(12) United States Patent
Sharma et al.

(10) Patent No.: US 10,194,380 B2
(45) Date of Patent: Jan. 29, 2019

(54) METHOD AND SYSTEM FOR CONTEXT AWARE SCHEDULING OF RESOURCES

(71) Applicant: Samsung Electronics Co., Ltd., Suwon-si, Gyeonggi-do (KR)

(72) Inventors: Diwakar Sharma, Bangalore (IN); Tushar Vrind, Bangalore (IN); Anshuman Nigam, Bangalore (IN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/573,363

(22) PCT Filed: May 11, 2016

(86) PCT No.: PCT/KR2016/004945
§ 371 (c)(1),
(2) Date: Nov. 10, 2017

(87) PCT Pub. No.: WO2016/182349
PCT Pub. Date: Nov. 17, 2016

(65) Prior Publication Data
US 2018/0146418 A1    May 24, 2018

(30) Foreign Application Priority Data

May 11, 2015  (IN) ........................... 2383/CHE/2015
May 10, 2016  (IN) ........................... 2383/CHE/2015

(51) Int. Cl.
*H04W 48/16* (2009.01)
*H04W 4/70* (2018.01)
(Continued)

(52) U.S. Cl.
CPC ............. *H04W 48/16* (2013.01); *H04W 4/70* (2018.02); *H04W 4/90* (2018.02); *H04W 24/08* (2013.01);
(Continued)

(58) Field of Classification Search
CPC ..... H04W 28/0289; H04W 4/22; H04W 4/70; H04W 4/90; H04W 76/50
See application file for complete search history.

(56) References Cited

U.S. PATENT DOCUMENTS

2013/0070710 A1    3/2013  Guo
2013/0155954 A1    6/2013  Wang et al.
(Continued)

FOREIGN PATENT DOCUMENTS

WO    WO-2014/004965 A1    1/2014
WO    WO-2014/065492 A1    5/2014

OTHER PUBLICATIONS

International Search Report PCT/ISA/210 for International Application No. PCT/KR2016/004945 dated Sep. 6, 2016.
(Continued)

*Primary Examiner* — Diane Mizrahi
(74) *Attorney, Agent, or Firm* — Harness, Dickey & Pierce, P.L.C.

(57) ABSTRACT

Embodiments herein provide a method and a system for context aware scheduling of resources. The method includes performing a cell search in based on a context database, the context database including temporal parameters, location parameters and network parameters, identifying a first cell corresponding to the network parameters in the database based on the cell search, and performing a connected mode procedure with the identified first cell.

20 Claims, 12 Drawing Sheets

(51) Int. Cl.
*H04W 4/90* (2018.01)
*H04W 72/04* (2009.01)
*H04W 24/08* (2009.01)
*H04W 56/00* (2009.01)
*H04W 76/27* (2018.01)
*H04W 4/02* (2018.01)

(52) U.S. Cl.
CPC ......... *H04W 56/001* (2013.01); *H04W 72/04* (2013.01); *H04W 72/0413* (2013.01); *H04W 4/02* (2013.01); *H04W 76/27* (2018.02)

(56) References Cited

U.S. PATENT DOCUMENTS

| | | |
|---|---|---|
| 2014/0206333 A1 | 7/2014 | Qiang |
| 2014/0235226 A1 | 8/2014 | Pinheiro et al. |
| 2014/0341141 A1 | 11/2014 | Nguyen et al. |
| 2014/0379804 A1* | 12/2014 | Wang .................... H04L 67/104 709/204 |
| 2015/0289078 A1 | 10/2015 | Kim et al. |
| 2017/0318445 A1* | 11/2017 | Kodaypak ............... H04W 4/22 |

OTHER PUBLICATIONS

Written Opinion of the International Searching Authority PCT/ISA/237 for International Application No. PCT/KR2016/004945 dated Sep. 6, 2016.
Sierra Wireless: "Provision of Mobility Support for MTC", R2-151083, 3GPP TSG RAN WG2 Meeting #89BIS, Apr. 11, 2015 (Apr. 11, 2015), Bratislava, Slovakia, XP050953211.

* cited by examiner

METHOD AND SYSTEM FOR CONTEXT AWARE SCHEDULING OF RESOURCES

CROSS-REFERENCE TO RELATED APPLICATION(S)

This application claims priority under 35 U.S.C. § 119 (a) to an Indian Provisional Patent Application filed on May 11, 2015 in the Indian Intellectual Property Office and assigned Serial No. 2383/CHE/2015, and an Indian Complete Patent Application filed on May 10, 2016 in the Indian Intellectual Property Office and assigned Serial No. 2383/CHE/2015, the entire contents of each of which are incorporated herein by reference.

TECHNICAL FIELD

The embodiments herein generally relate to Machine-type communication (MTC) device with wireless communication network. More particularly, related to a mechanism for context aware scheduling of resources.

BACKGROUND

Machine-type communication (MTC)/Machine to Machine (M2M) communication is advancing rapidly. The MTC communication facilitates a direct communication (requiring seldom human-machine interaction) with one or more MTC/M2M device(s) deployed therein. The MTC/M2M devices, (i.e., Internet of Things (IoT) device, wireless transmit/receive units (WTRUs)) are based on 3 GPP/cellular based protocols, with intention of saving power and reduce congestion in a network. These MTC/M2M device use radio access channels (i.e., communication channel) in compliance with the same protocol (i.e., 3 GPP, cellular network procedure) used by mobile device(s) to connect to a network. As a result, the cellular (IoT) networks designed for generic use cases brings in-efficiencies in resource allocation and adds overhead in a wireless communication system.

These M2M/MTC/IoT enables three major use cases such as command-response traffic (triggered reporting), having latency of 10 seconds, exception reported by IoT devices having latency of 3-5 seconds and periodic reports or keep alive. The IoT devices are use case centric (to solve a specific problem) and not for general purpose like smartphones/mobiles. A generic protocol design leaves sub optimal choices for a specific use case. However, optimizations are not designed based on scenarios and other use cases for M2M devices.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a mechanism for context aware scheduling of resources.

Another object of the embodiments herein is to provide a mechanism for creating a context database including temporal parameters, location parameters and network parameters acquired for a period of time (historically).

Another object of the embodiments herein is to provide a mechanism for initiating a cell search in an ultra-deep-sleep mode based on the temporal parameters, the location parameters and the network parameters.

Another object of the embodiments herein is to provide a mechanism for identifying a cell corresponding to the network parameters in the database based on the cell search.

Another object of the embodiments herein is to provide a mechanism for initiating a connected mode procedure with the identified cell.

Another object of the embodiments herein is to provide a mechanism of handling emergency condition by the MTC device and the cell.

Another object of the embodiments herein is to provide a mechanism to initiate creation of groups of MTC devices based on information such as number of reports generated for a time period and/or average duration between each generated report.

Another object of the embodiments herein is to provide a mechanism for creating groups by aggregating each MTC device in each of the group based on the information.

Another object of the embodiments herein is to provide a mechanism for indicating resource allocation to at least one MTC device within a group through a Machine Type Semi Persistence Scheduling-Physical Downlink Control Channel (PDCCH) (M-SPS-PDCCH) in an M-SPS interval to transmit UL data to the cell.

Accordingly the embodiments herein provide a method and system for context aware scheduling of resources. The method includes creating a context database including temporal parameters, location parameters and network parameters acquired for a period of time. Further, the method includes initiating a cell search in an ultra-deep-sleep mode based on the temporal parameters, the location parameters and the network parameters. Further, the method includes identifying a cell corresponding to the network parameters in the database based on the cell search. Furthermore, the method includes initiating a connected mode procedure with the identified cell.

In an embodiment, the method further includes synchronizing with a cell other than the identified cell; registering with the cell; and transitioning to a connected mode.

In an embodiment, the network parameters includes a Public Land Mobile Network (PLMN), a Radio Access Technology (RAT), a Timing Alignment (TA), a Uplink (UL)-Transmission (Tx) Power, a Physical Uplink Shared Channel (PUSCH) power and a Physical Uplink Control Channel (PUCCH) power.

In an embodiment, the method further includes sharing context ID, associated with the temporal parameters, the location parameters and the network parameters, present in the context database to the cell.

In an embodiment, the method further includes joining a group created by the cell for scheduling the UL data through Machine Type Semi Persistence Scheduling-Physical Downlink Control Channel (M-SPS-PDCCH) interval; identifying SPS resources allocated for MTC device within the group and transmitting UL data to the cell in the identified SPS resources.

In an embodiment, transmitting the UL data to the cell includes estimating downlink (DL) channel compensation and transmitting the UL data when the estimated DL channel compensation exceeds a predefined threshold.

In an embodiment, the method further includes dynamically updating the context database with the temporal parameters, the location parameters and the network parameters in response to determining that the UL data transmission is failed; and determining a cell other than the previously identified cell for synchronization.

In an embodiment, the method further includes determining a suspended state and indicating the suspend state to the identified cell in PUCCH, where the suspend state suspends allocation of resources by M-SPS-PDCCH for the MTC device.

In an embodiment, the method further includes determining a resume state; determining a current cell, where MTC device has to resume; indicating the resume state in PUCCH to the current cell, where the current cell is other than the cell where the MTC device suspended and the context database is available with all the cells, originally present in the context database, through internal network message exchange; and receiving resources from the current cell.

In an embodiment, where the resume state is indicated implicitly when a timer is expired, where the timer value is a predefined threshold period indicated in the suspend message.

Accordingly the embodiments herein provide a method and system for context aware scheduling of resources. The method includes indicating, by the MTC device, an emergency condition to the cell and allocating, by the cell, uplink (UL) resources with predefined conditions.

In an embodiment, the predefined conditions are maximum redundancy, minimum modulation, and time diversity.

In an embodiment, indicating the emergency condition includes minimizing a sounding reference signal (SRS) power.

In an embodiment, allocating the UL resources includes establishing a logical link entity catering to the emergency data between the cell and the MTC device.

Accordingly the embodiments herein provide a method and system for context aware scheduling of resources. The method includes receiving information from a plurality of MTC devices. The information comprises a number of reports generated for a time period and/or average duration between each generated report. The method includes creating groups by aggregating each MTC device in each of the group based on the information. Further, the method includes indicating resource allocation to at least one MTC device within a group through a Machine Type Semi Persistence Scheduling-Physical Downlink Control Channel (PDCCH) (M-SPS-PDCCH) in M-SPS interval to transmit UL data to the cell.

In an embodiment, allocating the M-SPS-PDCCH resources in the M-SPS interval to each the group is in response to determining that load in the cell is below a threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
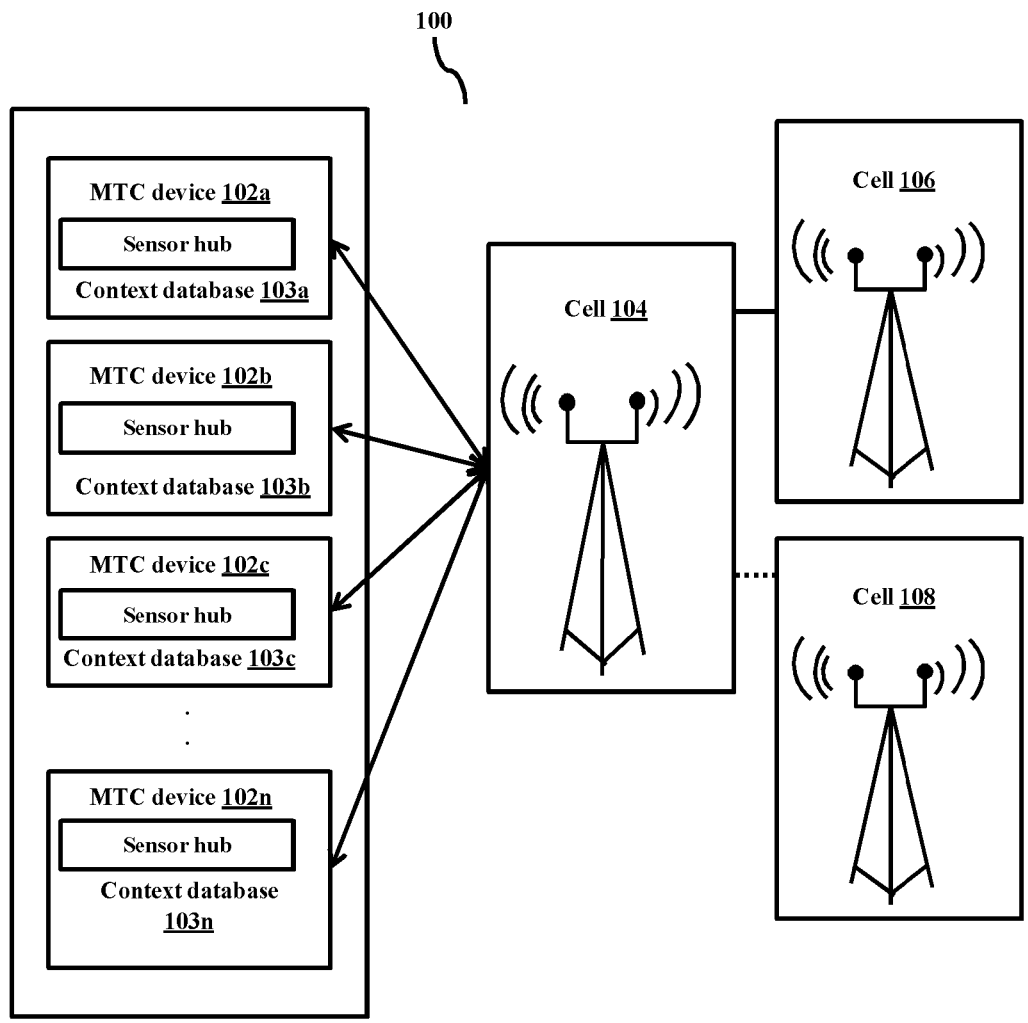
FIG. 1 shows an overview of a system for context aware scheduling of resources, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Prior to describing the invention in detail the definition of the term is mentioned below.

Ultra-Deep-Sleep mode: Refers to a state which is not a standardized state, it means that the device will get into power down mode, and not even listen to Paging and perform measurement, unless there is a wake up for event reporting triggered by sensor unit (s).

Throughout the description, the terms sensors, sensor unit and sensor hub are used interchangeably.

Throughout the description, the terms network and cell are used interchangeably.

Accordingly the embodiments herein provide a method and system for context aware scheduling of resources. The method includes creating a context database including temporal parameters, location parameters and network parameters acquired for a period of time (historically). Further, the method includes initiating a cell search in an ultra-deep-sleep mode based on the temporal parameters, the location parameters and the network parameters. Further, the method includes identifying a cell corresponding to the network parameters in the database based on the cell search. Furthermore, the method includes initiating a connected mode procedure with the identified cell.

Accordingly the embodiments herein provide a method for a method and system for context aware scheduling of resources. The method includes indicating, by the MTC device, an emergency condition to the cell and allocating, by the cell, uplink (UL) resources with maximum redundancy, minimum modulation, and time diversity.

Accordingly the embodiments herein provide a method and system for context aware scheduling of resources. The method includes receiving information from a plurality of MTC devices, wherein the information comprises at least one of a number of reports generated for a time period and average duration between each generated report. The method includes creating groups by aggregating each MTC device in each of the group based on the information. Further, the method includes indicating resource allocation to at least one MTC device within a group through a Machine Type Semi Persistence Scheduling-Physical Downlink Control Channel (PDCCH) (M-SPS-PDCCH) in the M-SPS interval to transmit UL data to the cell.

In an embodiment, allocating the M-SPS-PDCCH resources in the M-SPS interval to each the group in response to determining that load in the cell is below a threshold.

Unlike the conventional systems and methods, where the network is broadly generic, for e.g., allocating resources to various applications installed in the mobile device, the proposed M2M network protocol is specific to the event triggered by the MTC device (use case centric such as exceptional and periodic).

Accordingly the embodiments herein provides a mechanism for designing M2M protocol for a mobile originating (MO) only device/wearable device which is based on uploading of the data from the device to the M2M server based on events triggered from a sensor unit at the MTC device. For example activity trackers, for children or sports/fitness use cases. These specific use cases, does not require mobile terminating call scenarios, thus a lot of idle mode procedures can be disabled, and leaves a thin Mobile originated procedure, with other related optimizations.

The MTC device can attempt a MO call when it detects an event from the sensor unit to trigger the MO call. The event can be categorized under two broad scenarios such as normal and emergency. The detection can be based on the sensor inputs which are directly interfaced with a call initiation module in the M2M/MTC device architecture.

Unlike the conventional systems and methods, the proposed cell while allocating the resources understands the current case (use case) of the MTC device and allocates resources accordingly.

Unlike the conventional systems and methods, the proposed mechanism improves the standby battery life of the MTC device by removal of Discontinuous Reception (DRX) and cell re-selection procedure, which enables huge power saving in idle mode as the MTC device goes to the Ultra-Deep-Sleep mode and turns OFF its modem/RF/processor.

Referring now to the drawings, and more particularly to FIGS. 1 through 9, where similar reference characters denote corresponding features consistently throughout the figures, there are shown preferred embodiments.

FIG. 1 shows an overview of a system 100 for context aware scheduling of resources, according to an embodiment as disclosed herein. The system 100 includes one or more MTC devices (102a-102n, hereinafter "102") communicating with a cell 104. In an embodiment, the MTC device 102 includes a sensor unit configured to detect the events such as smoke detection, emergency metering, activity tracker detection, or the like.

In an embodiment, the MTC device 102 are Internet of Things (IoT) devices such as activity trackers, sensors, wireless transmit/receive units (WTRUs) or the like.

In an embodiment, the cell 104 is an eNodeB (eNB), a Base station (BS) deployed in a network.

A Servicing Network Gateway (SGW) provides a connection to the Packet Data Network Gateway (PGW), which in turn provides a connection to a context database 103 (for example, stored in a MTC tracking server) created by the MTC device 102. The context database 103 encompasses the context aware parameters associated with the MTC device 102 that was created by the MTC device 102 for a period of time in the Ultra-Deep-Sleep mode.

Unlike the conventional systems and methods, the cell 104 acquisition (camping onto the network) by the MTC device 104 from the Ultra-Deep-Sleep mode (for e.g., the idle mode) is fast, by virtue of the context database 103.

For example, considering the mere fact that the MTC device 102 such as activity trackers, emergency modules follows the specific patterns such as consistently operating (accessing the cell 104) from same premises, same location, same time interval, or the like. The MTC device 102 accessing the network during these scenarios can be profiled, for example, which network (or cell 104) that the MTC device 102 may camp on, the network access parameters, the location parameters and the temporal parameters applied to access the network.

These profiles can form a context for the MTC device 102. Thus every time the MTC device 102 accesses the network, based on the context (time and/or location), a cell search is performed and results in for the faster connection to the cell. The context is based on a historical acquisition of temporal parameters and location parameters. Further, context ID is created against the temporal parameters and the location parameters.

The context database 103 includes the temporal parameters such as the time at which the MTC device 102 access the cell 104. Further the context database 103 includes location parameters such as GPS coordinates of the MTC device 102 while accessing the cell 104 at the time instance. Furthermore the context database 103 includes the network parameters such as the PLMN, the RAT, the TA, the UL-Tx Power, the PUSCH power, the PUCCH power, or the like (as shown in the Table. 1).

TABLE 1

| Context | Time (Mandatory) | Location (optional) | Network |
|---|---|---|---|
| #1 | T = T1 | L = L1 | {Cell-1, PLMN-1, RAT-1, TA-1, UL-TxPow-1, PUSCH_pow-1, PUCCH_pow-1} |

TABLE 1-continued

| Context | Time (Mandatory) | Location (optional) | Network |
|---|---|---|---|
| #2 | T = T2 | L = L2 | {Cell-2, PLMN-2, RAT-2, TA-2, UL-TxPow-2, PUSCH_pow-2, PUCCH_pow-2} |
| # . . . | | | |
| # . . . N | T = Tn | L = Ln | {Cell-n, PLMN-n, RAT-n, TA-n, UL-TxPow-n, PUSCH_pow-n, PUCCH_pow-n} |

Unlike the conventional systems and methods, where the context based search was performed based on location and limited network parameters (such as the PLMN and the RAT) only, the proposed context based search for the network, using the context database 103, by the MTC device 102 includes the temporal parameters, the network parameters such in accordance with the Cell, PLMN and RAT, the parameters includes (TA, UL-Tx Pow, PUSCH_pow, and PUCCH_pow).

Unlike the conventional systems and methods, the proposed method provides a use case specific/context aware network in order to optimize the network for the MTC device 102 in the exception reporting by having latency of 3-5 seconds and periodic reports or Keep alive, insensitive to latency.

For example, kids usually have some pre-defined places, where they go as per their regular schedule, e.g. Park, Day care, School, home, friend's house. It can be inferred, that the kids context can be associated with the cellular connectivity, e.g. based on (Time, Location, activity) consequently association of the cell can be predicted with coarse level accuracy.

The reports transmitted by the MTC device 102 can be, for e.g., classified as (a) "Delay tolerant Mobile originated (MO) data" (use case-Periodic reports) (b) "Emergency information data (use case-Emergency reported).

In an embodiment, the Periodic measurement reports, where the MTC device continue transmitting the measurements at periodic interval of time. For e.g., temperature reports, meter reading, reports generated from the activity trackers, or the like. In an embodiment, for e.g., the emergency reporting by the MTC device 102 can include transmitting the emergency measurements such as fire alert, smoke detection, with no latency.

In an embodiment, with the required network support, the MTC device 102 can only attach once with the network, negotiate all security, capability and configuration parameters and thereafter it can be attached to the network, even though it shuts off its modem/RF. Thus the MTC device 102 context remains alive in the core network, even though it is never paged or doing periodic location/tracking area update, for which the MTC device 102 informs that its mode of operation is MTC-Mobile Originated (MO) communication.

In an embodiment, the cell 104 can configured to receive the context database 103 associated with the MTC device 102. In an embodiment, during the MTC device 102 accessing the neighboring the cells 106 and 108, a Handover of the context database 103 can be performed by the cell 104 to the one or more neighboring cells 104a, 104b . . . 104n. Thus, the context database 104 can be dynamically updated whenever the MTC device 102 camps on to the neighboring cells 106 and 108.

In an embodiment, the MTC device 102 connects to the network, from the Ultra-Deep-Sleep mode upon camping onto the cell 104, the operations of the MTC device in the connected mode is detailed below.

Connected mode (Specific to Emergency Service for MO-only devices): The MTC device 102 in the connected mode can be configured to transmit the report in case of the emergency services, where the communication between the MTC device 102 and the cell 104 is highly reliable and with minimum latency. Thus, a cross layer optimization is triggered where the MTC device 102 can be configured to trigger the UL data with highly reliable Radio link entity. The latency can be minimized by providing robust resource allocation for radio link, thereby minimizing the need of retransmission, as detailed in conjunction with FIG. 8

The FIG. 1 shows the system 100 but it is to be understood that other embodiments are not limited thereon. In other embodiments, the system 100 may include less or more number of components. Further, the labels or names of the components are used only for illustrative purpose and does not limit the scope of the invention. One or more components can be combined together to perform same or substantially similar function in the system 100.

Figure 2A:
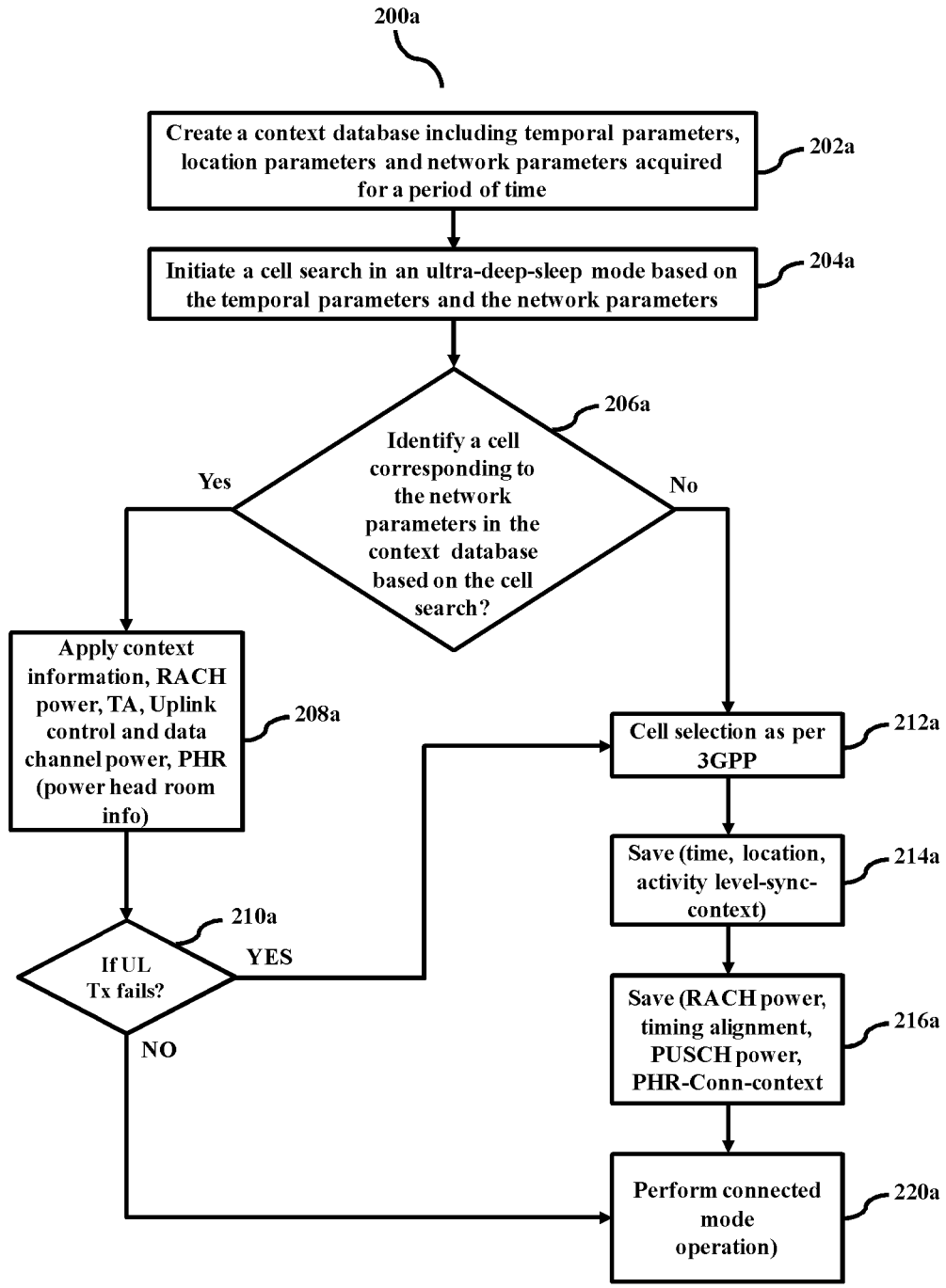
FIG. 2a is a flow diagram illustrating a method of sharing context database by a MTC device and applying context information based on an identified cell, according to an embodiment as disclosed herein.

FIG. 2a is a flow diagram illustrating a method 200a of sharing context database by a MTC device and applying context information based on an identified cell, according to an embodiment as disclosed herein. In an embodiment, when the MTC device 102 is switched "ON" the MTC device 102 initiates the network search procedure where the modem/RF/processor of the MTC device 102 request for the resources, cellular (3GPP) network procedure.

3GPP cell search procedure: In an embodiment, the method 200a includes initializing the cell search (cell 104 or neighboring cells 106 and 108.) as per the 3GPP (cellular) search procedure. In an embodiment, the method 200a allows the MTC device 102 to initialize the cell search as per the 3GPP (cellular) search procedure.

Further, the method 200a includes saving the temporal parameters and the location parameters (time, location, activity level-sync-context). In an embodiment, the method 200a allows the MTC device 102 to save (time, location, activity level-sync-context) acquired for a period of time.

Further, the method 200a includes saving the network parameters (RACH power, timing alignment, PUSCH power, PHR-Conn-context). In an embodiment, the method 200a allows the MTC device 102 to save the network parameters (RACH power, timing alignment, PUSCH power, PHR-Conn-context).

Further, the method 200a includes initializing the connected mode operation procedure (for e.g., registering to the cell identified based on 3 GPP search procedure). In an embodiment, the method 200a allows the MTC device 102 to initialize the connected mode operation procedure.

Thus, the aforementioned parameters (temporal, location and network) are tracked and stored in the context database 103 of the MTC device 102. In an embodiment, the MTC device 102 goes into the Ultra-Deep-Sleep mode, where the processor/modem/RF of the MTC device goes into sleep mode (de-allocating the resources). Consequently, the below mentioned steps, of the method 200a details the functions of the MTC device 102 in acquiring the network (cell 102) and transitioning to the connected mode (for e.g., re-establishment) from the Ultra-Deep-Sleep mode.

In an embodiment, at step 202a, the method 200a includes creating the context database 103 with the stored temporal parameters, the location parameters and the network parameters acquired for the period of time (historically). In an embodiment, the method 200a allows the MTC device 102 to create the context database 103 with the temporal parameters, the location parameters and the network parameters acquired for the period of time.

Further, at step 204a, the method 200a includes initiating the cell search (cell 104 or neighboring cells 106 and 108) based on the temporal parameters, the location parameters and the network parameters. In an embodiment, the method 200a allows the MTC device 102 to initiate the cell search (in the Ultra-Deep-Sleep mode) based on the temporal parameters, the location parameters and the network parameters.

Further, at step 206a, the method 200a includes identifying the cell (cell 104 or neighboring cells 106 and 108.) corresponding to the network parameters in the context database 103 based on the cell search. In an embodiment, the method 200a allows the MTC device 102 to identify the cell corresponding to the network parameters in the database based on the cell search.

If the MTC device 102 identifies that the cell (i.e., cell 104) corresponding to the network parameters (from the context database 103) is available thereon, at step 208a, the method 200a includes applying the context information, the RACH power, the TA, the Uplink control, the data channel power, and PHR (power head room info) in order to camp to the cell (in the connected mode).

Further, at step 210a, the method 200a includes determining the status of the UL transmission. If the UL-Tx fails, the MTC device 102 initiates the cell search as per 3GPP search procedure.

If the MTC device 102 identifies that the cell corresponding to the network parameters (from the context database 103) is unavailable thereon, at step 212a-216a, the method 200a includes initializing the cell search (cell 104 or neighboring cells 106 and 108.) as per the 3GPP (cellular) search procedure detailed above.

The various actions, acts, blocks, steps, or the like in the flow diagram 200A may be performed in the order presented, in a different order or simultaneously. Further, in some embodiments, some of the actions, acts, blocks, steps, or the like may be omitted, added, modified, skipped, or the like without departing from the scope of the invention.

In an embodiment the MTC device 102 can do a normal network attach procedure on the best cell, and indicate to the cell using attach type message identifier, that the MTC device 102 is the MO-only device, type of device, traffic class, Mobility Type, data size, which can indicate to the network that periodic updates like Tracking area update (TAU)/Routing Area Update (RAU) cannot be performed for the MTC device 102, so that the network doesn't mark the MTC device 102 as 'not reachable' or 'switched-off'.

The idle mode procedures like the cell reselections and maintaining N-Cell cannot be present for the MTC device 102. Thus, the MTC device 102 maintains a 'thin' system information database, and can limit reading and maintaining essential SIB's required for connection management, for example—SIB1, SIB2 and SIB9. In an embodiment Table. 2, herein illustrates details regarding the system information read by the MTC device 102 in the 3GPP LTE (Long Term Evolution)—MO use case.

TABLE 2

| Type | Description | Read by the MTC device 102 |
| --- | --- | --- |
| SIB 1 | i) Cell Access Related Information-PLMN Identity List, PLMN Identity, TA Code, Cell identity & Cell Status ii) Cell Selection Information - Minimum Receiver Level iii) Scheduling Information - SI message type & Periodicity, SIB mapping Info, SI Window length | YES |
| SIB 2 | i) Access Barring Information - Access Probability factor, Access Class Baring List, Access Class Baring Time ii)Semi static Common Channel Configuration-Random Access Parameter, PRACH Configuration iii) UL frequency Information - UL EARFCN, UL Bandwidth, additional emission | YES |
| SIB 3 | i) Information/Parameters for intra-frequency cell reselections | NO |
| SIB 4 | i) Information on inter-frequency neighboring cells | NO |
| SIB 5 | i) Information on inter-frequency neighboring cells | NO |
| SIB 6 | i) Information for reselection to UMTS (UTRAN) cells | NO |
| SIB 7 | i) Information for reselection to GSM (GERAN) cells | NO |
| SIB 8 | i) Information for reselection to CDMA2000 systems | NO |
| SIB 9 | i) Home eNodeB name - for future LTE femto cell applications | YES |
| SIB 10 + 11 | i) ETWS (Earthquake and Tsunami Warning System) Information. | Yes |
| SIB 12 | i) Commercial Mobile Alerting System (CMAS) Information. | NO |

The MTC device 102 doesn't maintain periodic update related timers, and remove any such procedures. Further, with the context database 103, no DRX related procedures will be applied in the MTC device 102.

In an embodiment, the idle mode is centric only to Ultra-Deep-Sleep mode, where in protocol and physical layer, processor and RF clocks are completely shut off and only Ultra-Deep-Sleep mode clock is running to keep track of Wake up. The Wake up can be interrupted based only, when device is interrupted (explicitly triggering the sensor unit of the MTC device 102) as a result of data analysis of received data from sensor unit.

In an embodiment, no PAGING channel is designed and configured, i.e., the MTC device 102 can never wait/poll/interrupt for any notification from the network, when in the Ultra-Deep-Sleep mode trigger of the MO call does not require man-machine interface (MMI), instead, MO call will be triggered based on the post analysis of received data from the sensor unit.

The MTC device 102 does not need to perform measurements thereby need of re-selections could be avoided; moreover, the MTC device 102 can select the cell, just before MO operation.

Removal of the DRX and cell re-selection would enable huge power saving in idle mode and UE can go to the Ultra-Deep-Sleep mode and shut off its modem/RF/Application processor and could wake up then again based on the implicit trigger from sensors (sensor unit) and explicit manual trigger. The MTC device 102 can attach only once with the network and negotiate all security, capability and configuration parameters and after that, the MTC device can still remain attached with the network.

Figure 2B:
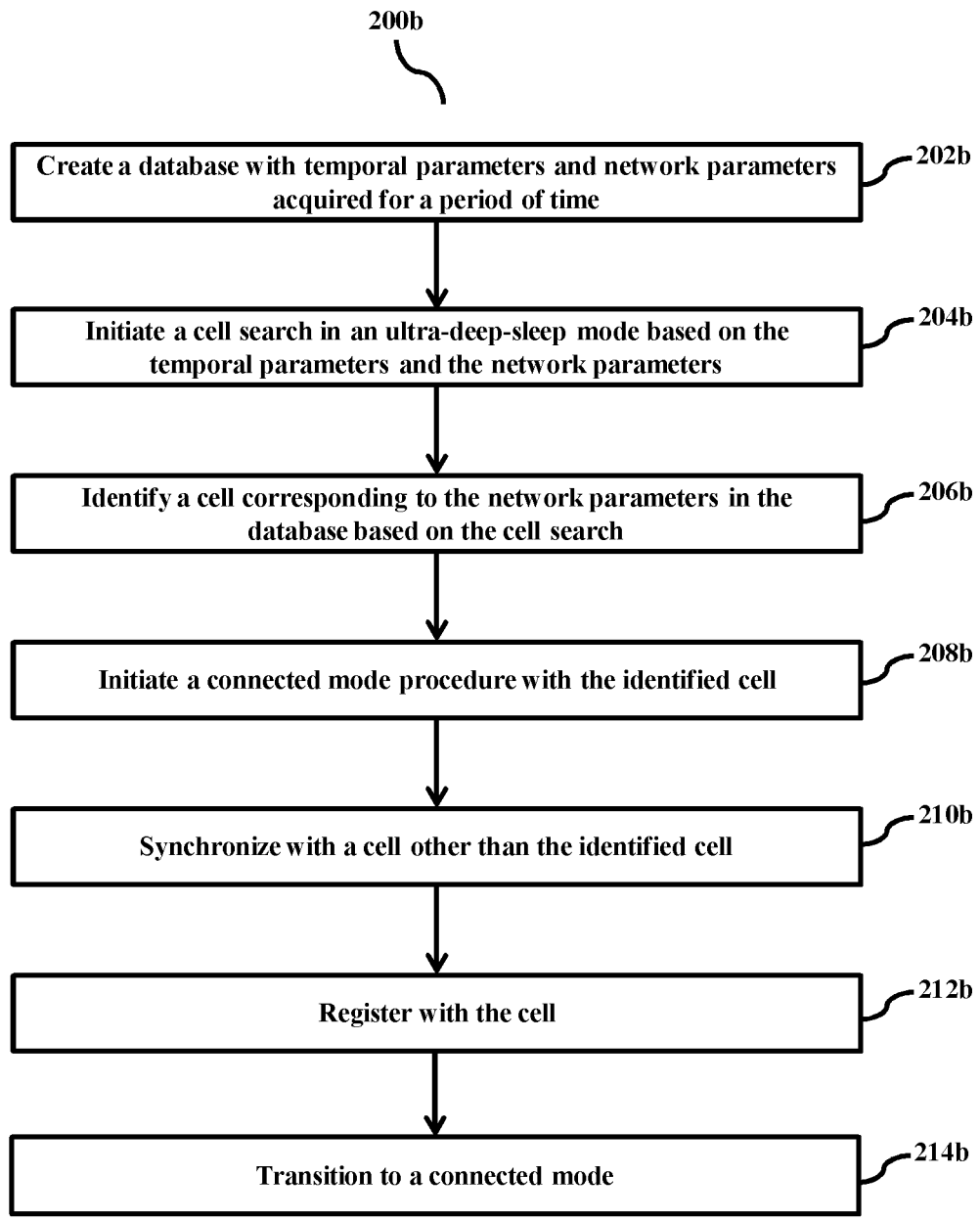
FIG. 2b is a flow diagram illustrating a method of transitioning to a connected mode from an ultra-deep-sleep mode by a MTC device, according to an embodiment as disclosed herein.

FIG. 2b is a flow diagram illustrating a method 200b of transitioning to a connected mode from an ultra-deep-sleep mode by a MTC device, according to an embodiment as disclosed herein. In an embodiment, at step 202b, the method 202b includes creating the context database 103 with the stored temporal parameters, the location parameters and the network parameters acquired for the period of time.

At step 204b, the method 202b includes initiating the cell search (cell 104 or neighboring cells 106 and 108.) based on the temporal parameters, the location parameters and the network parameters. At step 206b, the method 202b includes identifying the cell (cell 104 or neighboring cells 106 and 108.) corresponding to the network parameters in the context database 103 based on the cell search.

At step 208b, the method 202b includes initiating the connected mode procedure with the identified cell. At step 210b, the method 202b includes synchronizing with the cell other than the identified cell (i.e, cell 104).

At step 210b, the method 202b includes registering with the cell (other than the identified cell). In an embodiment, whenever the MTC device 102 camps on to a new cell other than the cell 104/the cell(s) associated with the context database 103, the MTC device 102, requires completing the registration procedure as applied by the network operators.

In an embodiment, whenever the MTC device 102 camps on to the cell 104/the cell(s) associated with the context database 103, the MTC device 102 doesn't require the cell registration, thus faster acquisition of the cell can be achieved.

At step 214b, the method 202b includes transitioning to the connected mode with the cell other than the identified cell (i.e., cell 104).

The various actions, acts, blocks, steps, or the like in the flow diagram 200B may be performed in the order presented, in a different order or simultaneously. Further, in some embodiments, some of the actions, acts, blocks, steps, or the like may be omitted, added, modified, skipped, or the like without departing from the scope of the invention.

Figure 2C:
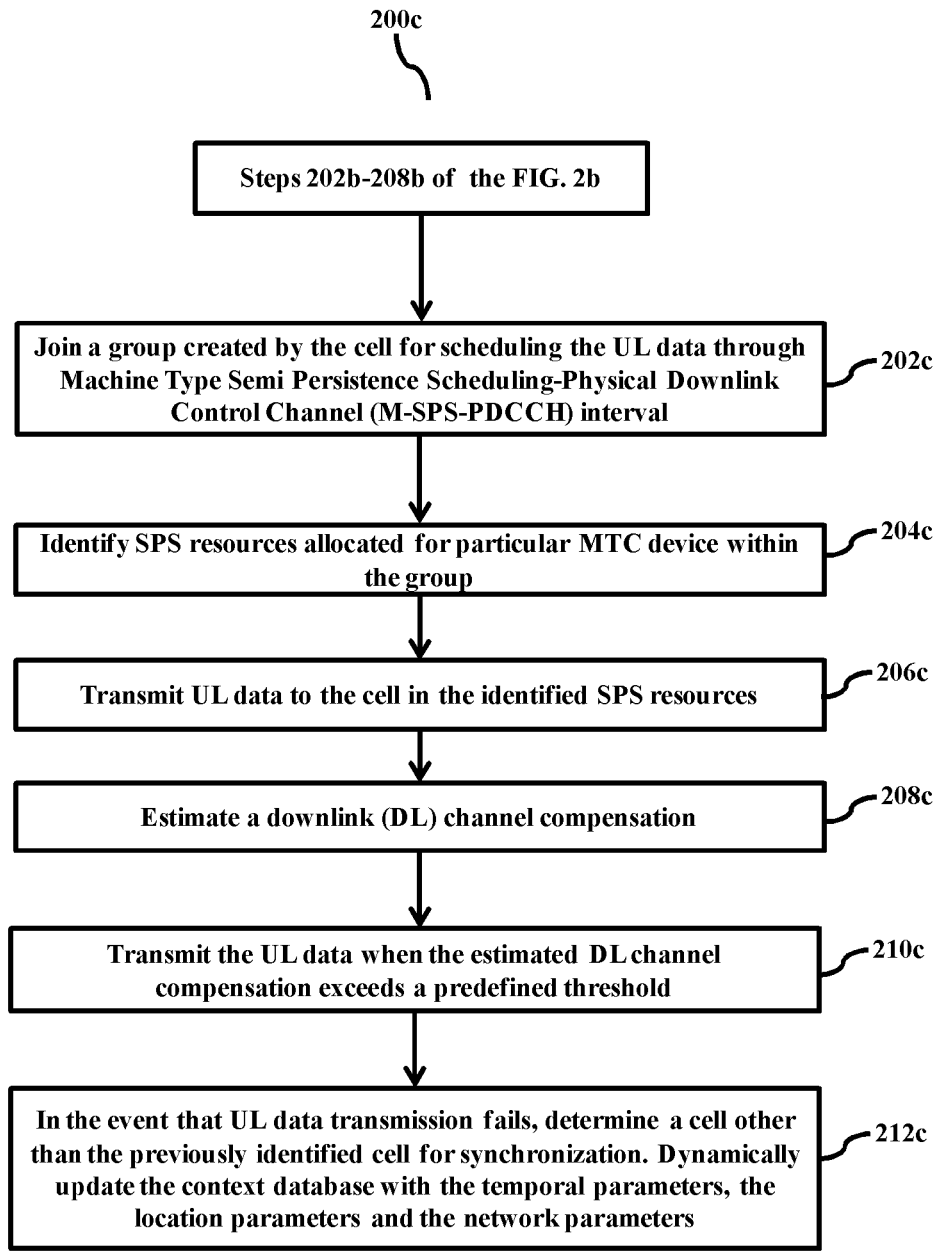
FIG. 2c is a flow diagram illustrating a method of dynamically updating context database, according to an embodiment as disclosed herein.

FIG. 2c is a flow diagram illustrating a method 200c of dynamically updating context database, according to an embodiment as disclosed herein.

The steps 202b-208b of the FIG. 2b is to be performed for the MTC device 102 for the connected mode. Further, at step 202c, the method 200c includes joining a group created by the cell for scheduling the UL data through Machine Type Semi Persistence Scheduling-Physical Downlink Control Channel (M-SPS-PDCCH) interval (as detailed in conjunction with FIGS. 5a-5b).

At step 204c, the method 200c includes identifying the SPS resources allocated for particular MTC device 102 within the group. In an embodiment, the method 200c allows the MTC device 102 to identify the SPS resources allocated for the particular MTC device 102 within the group.

At step 206c, the method 200c includes transmitting the UL data to the cell 104 in the identified SPS resources. The UL data includes data related to metering equipments, data triggered from the sensor unit, or the like.

At step 208c, the method 200c includes estimating the downlink (DL) channel compensation, for e.g., the RFCI, RSRP values of the DL channel. At step 210c, the method 200c includes transmitting the UL data when the estimated DL channel compensation exceeds a predefined threshold.

The predefined threshold may include the values communicated by the sensor unit, of the MTC device 102, to the cell 104. For example, the sensor unit of the MTC device 102 can detect the use case for MO origination based on normal or emergency event, and such information element whether the MO is for normal or emergency (MO-only, MO-only-emergency) will be shared with the cell 104, during RACH procedure, which will assist in selecting the best possible scheduler in the cell 104.

The data allocation can be made dynamic or best-effort (not fair scheduled), when the cell 104 knows type of the MTC device 102 initiating the call, and also the type for data transaction (normal or emergency). The MTC device 102 can initiate the MO call, when it assumes that the channel compensation is minimum (good radio conditions).

The sensor unit information can be used to derive few inferences such that, device is static, and also outdoor (light, activity, ambience, wind, location and other such advanced sensors). This can be an additional optimization in the area of power consumption, since the MTC device 102, while moving or indoor device needs to be applying additional power to compensate the channel losses. In such cases, the transmission can be aligning with the "$N^{th}$" periodic occasion (SPS based). Therefore, few scheduling occasion will be mute for the MTC device 102 in the group. The sensor information can also be sent to cell 104 during SPS allocation, so that cell 102 will not schedule the MTC device 102 for a specific interval.

Further, when the cell 104 can be configured to (semi-statically) allocate the resources based on the appropriate time when the MTC device 102 can perform data transfer based on traffic loads expected during that time (analytics for MTC traffic vs. normal traffic at network). In an embodiment, the cell 104 should inform the wide sense load pattern to the MTC device 102, which would be quantized further to drive the MIN LOAD time, so that "best efforts data" can be align with the cell 104 (network) load.

This design specially targeted the use case, where in large number of MTC devices 102 may try to make the MO call and use the network resources, which might disturb the normal mobile user traffic especially during peak load hours due to control resources. The control radio resources can be completely occupied by MTC-MO trigger devices, using very small part of spectrum, but occupy all control resources and the network cannot schedule the other MTC devices 102. This would result in spectrum fragmentation, where in, spectrum is available but due to lack of control resources, no more addition of device is possible.

The transmission could be aligning with the $N^{th}$ periodic occasion in such cases. Few scheduling occasion will be muted and for the MTC device 102 in a group. The network will inform the MTC device 102 that the network will not schedule the MTC device 102 for "X" number of scheduling intervals.

Due to the nature of traffic for the MO only MTC devices, for most of the scenarios and cases, the MTC device 102 knows the traffic and the delay tolerance of the traffic data in prior. So the MTC device 102 should inform to the network, in dedicated signaling, with three parameters data size, delay tolerance and type of data. Once all such information is available at the cell 104, then the cell 104 can be configured to decide the suitable SPS interval and periodicity based on the network resource availability, and scheduling priorities.

The cell 104 sends the SPS configuration details in dedicated signaling during connected mode. The kind of data transfer request (normal or emergency) can be embedded in RACH procedure, so that scheduler can take the action and choose the appropriate traffic allocation for the MTC device 104.

At step 212c, if the UL data transmission is failed. The method 200c includes determining the cell other than the previously identified cell (for e.g., the cell 104) for synchronization and dynamically updating the context database 103 with the temporal parameters, the location parameters and the network parameters.

The various actions, acts, blocks, steps, or the like in the flow diagram 200C may be performed in the order presented, in a different order or simultaneously. Further, in some embodiments, some of the actions, acts, blocks, steps, or the like may be omitted, added, modified, skipped, or the like without departing from the scope of the invention.

Figure 3:
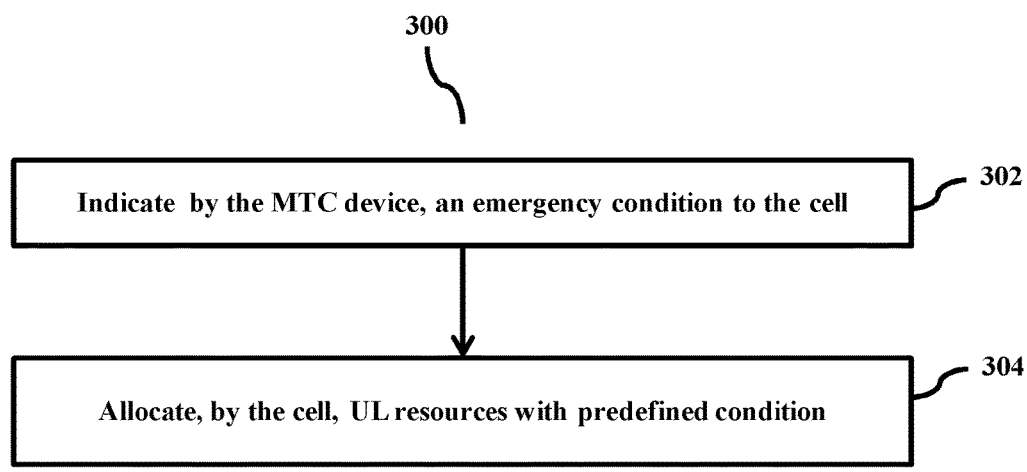
FIG. 3 is a flow diagram illustrating a method for context aware scheduling of resources during emergency condition, according to an embodiment as disclosed herein.

FIG. 3 is a flow diagram illustrating a method 300 for context aware scheduling of resources during emergency condition, according to an embodiment as disclosed herein. The step 302 is performed by MTC device 102 and step 304 is performed by the cell 104.

Figure 6:
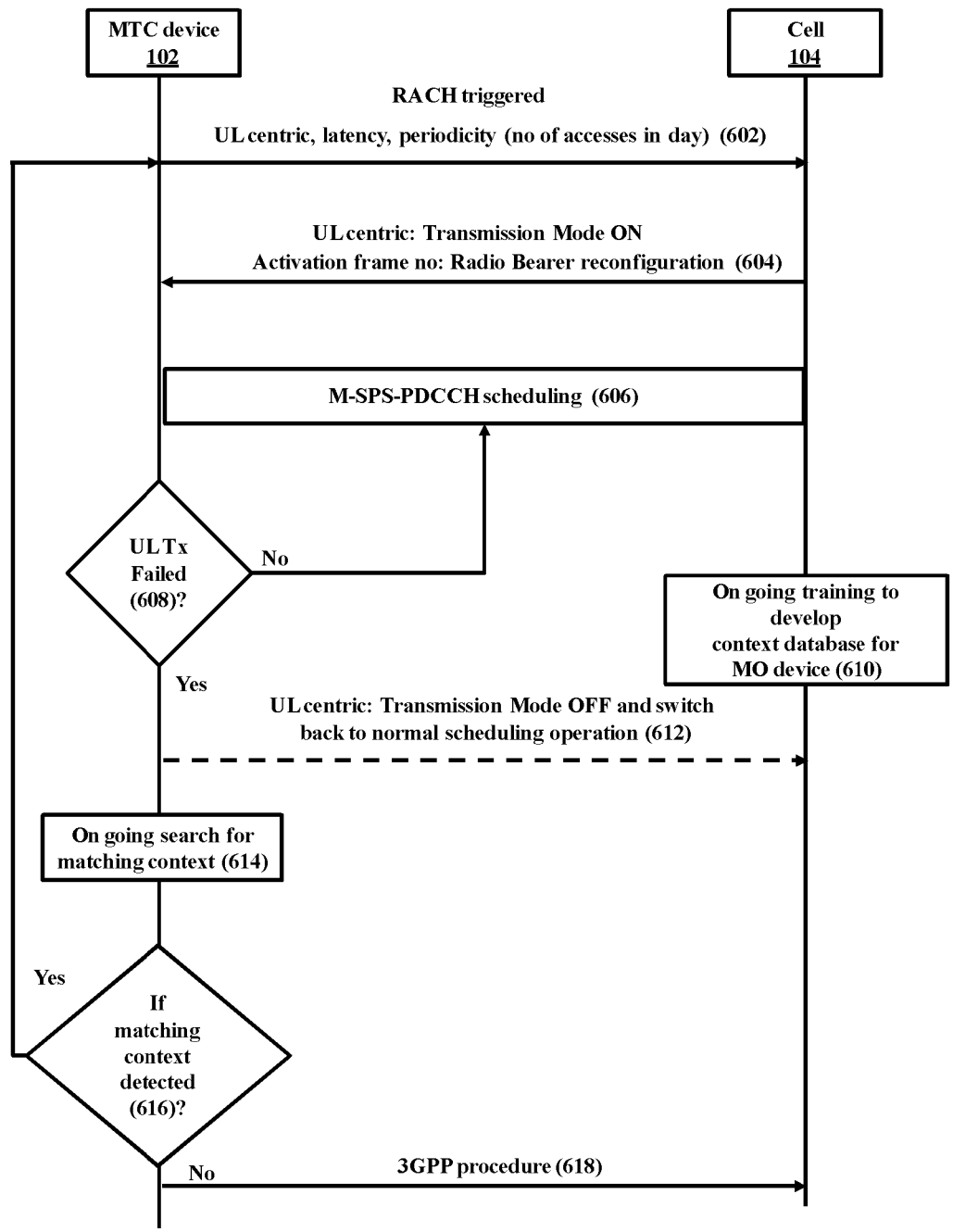
FIG. 6 is a sequence diagram depicting various signaling messages between a MTC device and a cell for context aware scheduling of resources, according to an embodiment as disclosed herein.
Figure 7:
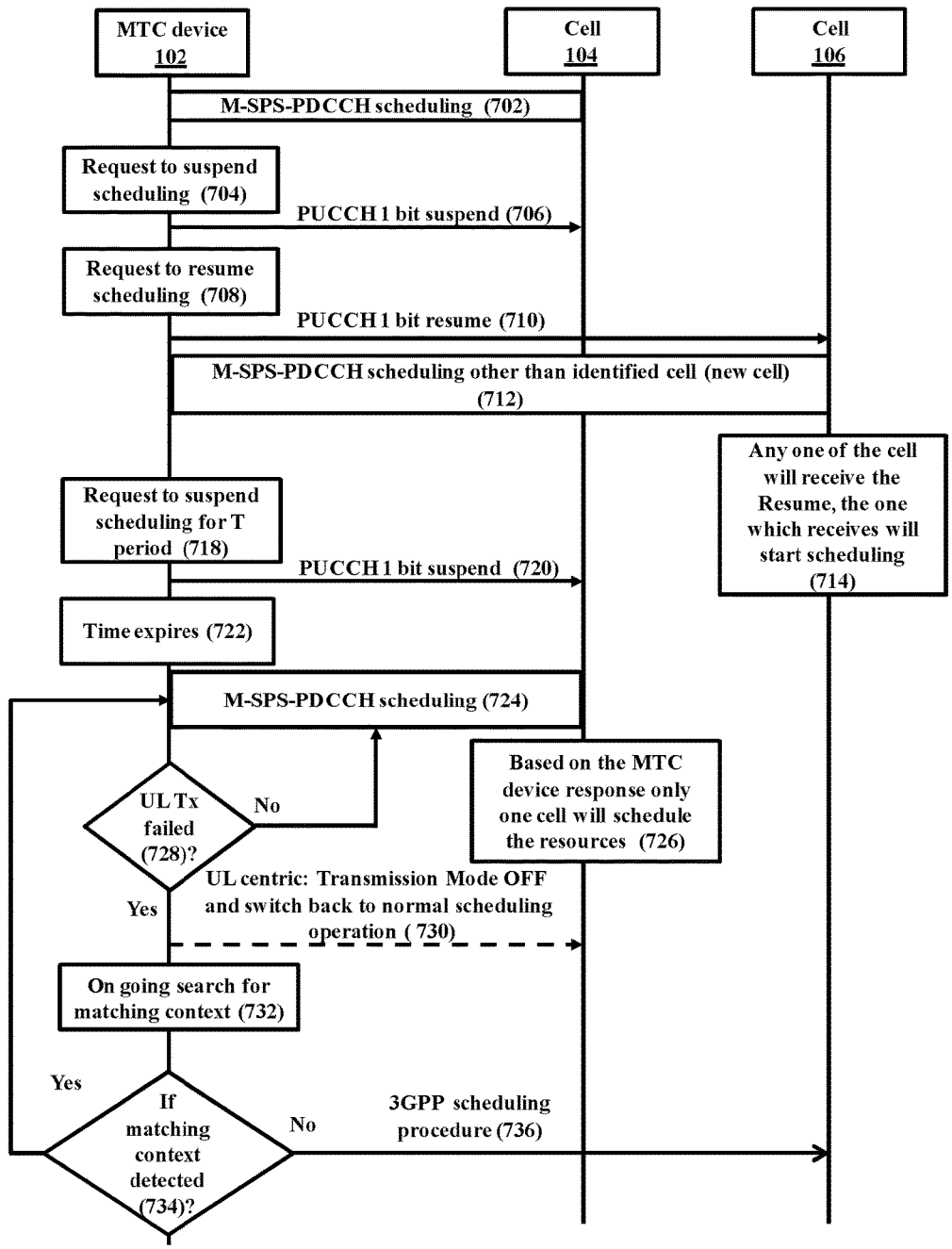
FIG. 7 is a sequence diagram depicting various signaling messages between a MTC device and one or more cells for context aware scheduling of resources, according to an embodiment as disclosed herein.
Figure 8:
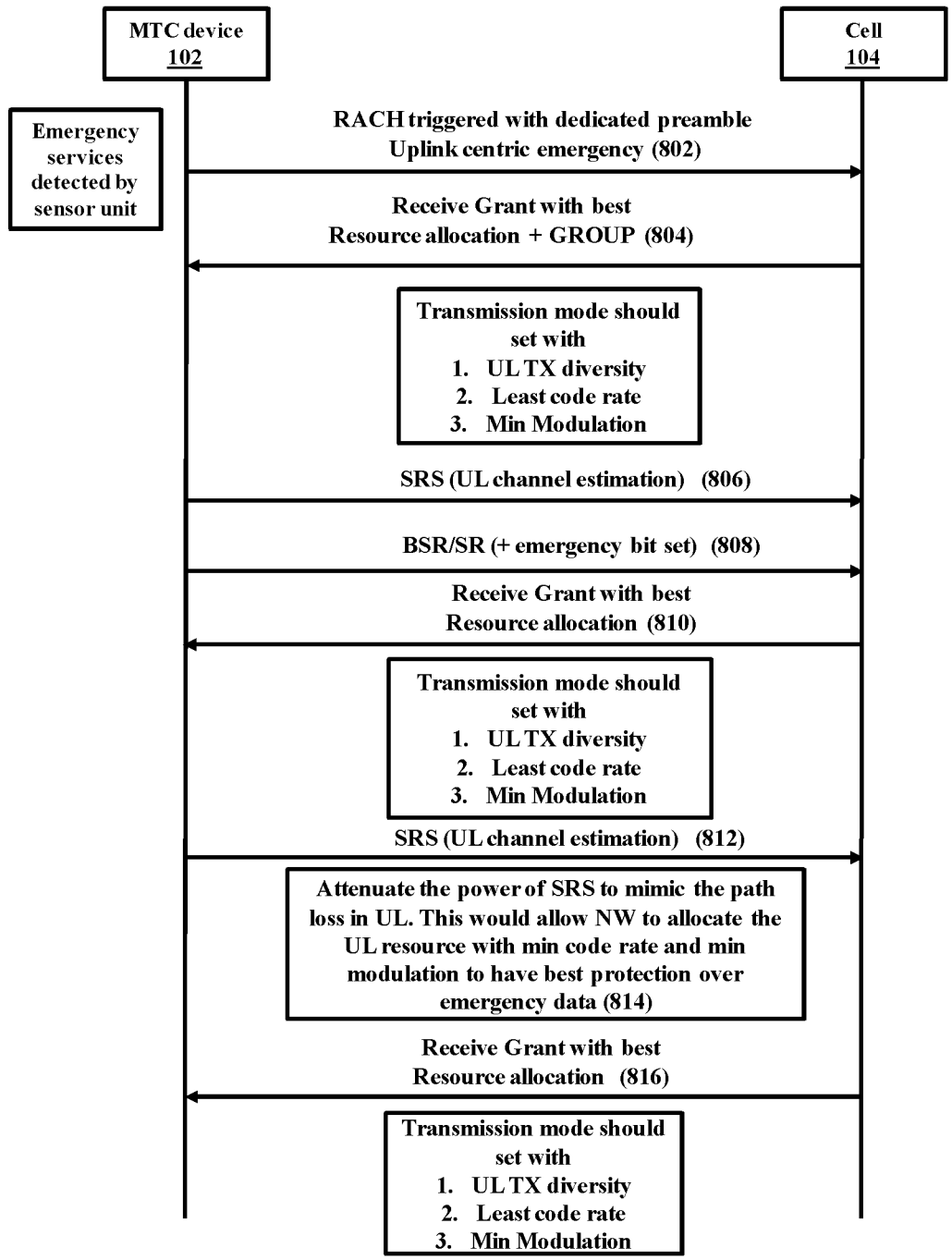
FIG. 8 is a sequence diagram depicting various signaling messages between a MTC device and a cell for handling emergency conditions, according to an embodiment as disclosed herein.

At step 302, the method 300 includes indicating an emergency condition to the cell 104 (as detailed in conjunction with the FIGS. 6-8).

At step 304, the method 300 includes allocating the UL resources with predefined conditions. In an embodiment, the predefined conditions are maximum redundancy, minimum modulation, and time diversity (as detailed in conjunction with the FIGS. 6-8).

Figure 4:
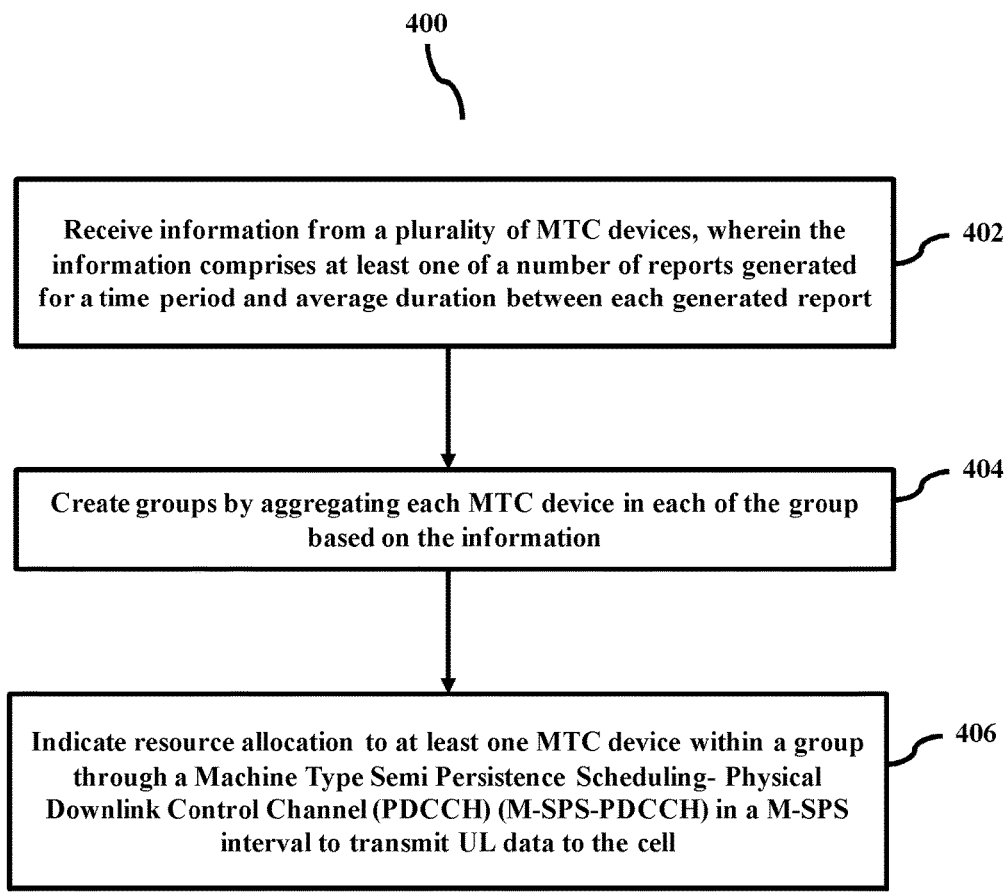
FIG. 4 is a flow diagram illustrating a method for context aware scheduling of resources to at least one MTC device is a group, according to an embodiment as disclosed herein.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention FIG. 4 is a flow diagram illustrating a method 400 for context aware scheduling of resources to at least one MTC device 102 is a group, according to an embodiment as disclosed herein. In an embodiment, at step 402, the method 400 includes receiving information from a plurality of the MTC device(s) 102 (referred as (referred as MO-D1, MO-D2, MO-D3, MO-D4, MO-D5, MO-D6 ... MO-Dn). In an embodiment the information includes number of reports generated for the time period and/or average duration between each generated report.

Further, at step 404, the method 400 includes creating groups (Group 1 ... Group N) by aggregating each MTC device 102 (MO-D1, MO-D2, MO-D3, MO-D4, MO-D5, MO-D6 ... MO-Dn) in each of the group based on the information.

Figure 5A:
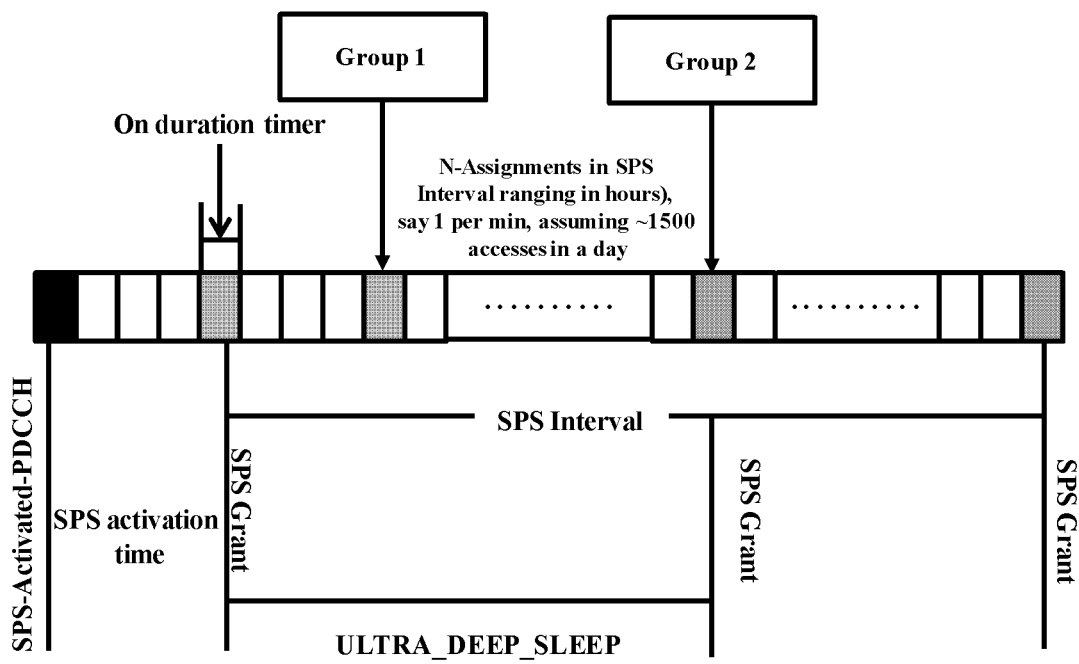
FIGS. 5a-5b illustrates M-SPS-PDCCH based scheduling of resources for a group of MTC devices with variable SPS interval, according to an embodiment as disclosed herein.
Figure 5B:
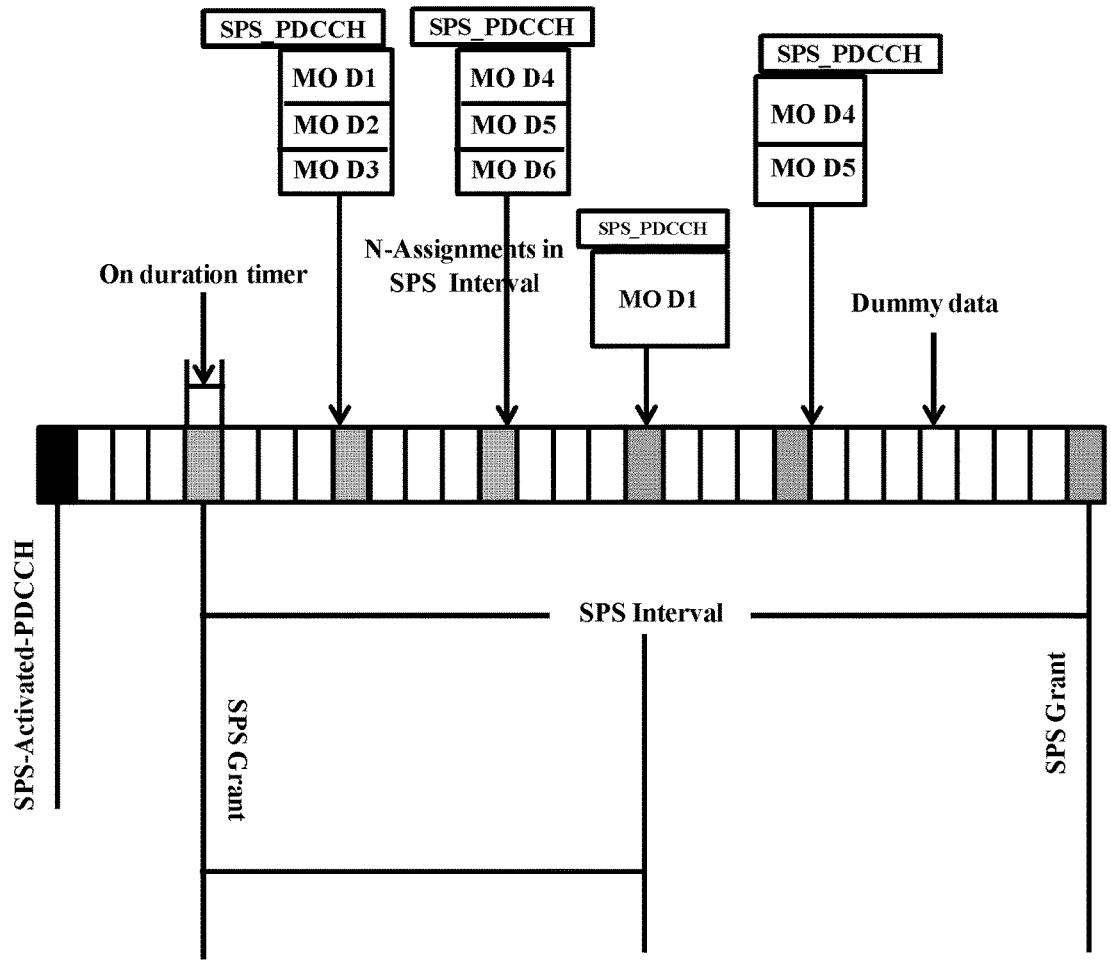

Furthermore, at step 406, the method 400 includes indicating resource allocation to at least one MTC device within the group through a Machine Type Semi Persistence Scheduling-Physical Downlink Control Channel (PDCCH) (M-SPS-PDCCH) in a M-SPS interval to transmit the UL data to the cell 104 (detailed in conjunction with FIGS. 5a-5b).

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

The FIGS. 5a-5b illustrates the M-SPS-PDCCH based scheduling of resources for a group of MTC devices with variable SPS interval, according to an embodiment as disclosed herein. In an embodiment, the group of MTC device(s) 102 (the MO-D1, MO-D2, MO-D3, MO-D4, MO-D5, MO-D6 ... MO-Dn) can be scheduled in the semi persistence manner. the SPS resources can be assigned to the group of the MTC device(s) 102/MO device (MO-D1, MO-D2, MO-D3, MO-D4, MO-D5, MO-D6) as shown in the FIG. 5B. Consequently, the group of the MO devices (MO-D1 ... MO-Dn) can be scheduled as per the semi persistence manner. For the SPS scheduling, all the MO devices in the group share the same or integer multiple of scheduling instances with each other i.e., MO-D1 and the MO-D2 having same scheduling interval or integer multiple of scheduling interval are grouped together.

In an embodiment, two category of the MTC-MO only device would emerge, Category-1 devices providing periodic metering information. Such devices are expected to have almost no mobility. So such devices can inform to the network about the type of device (Static/Low mobility) while triggering initial RACH connection, so that the network can optimize the scheduling.

As a result, the entire context (TA, cell ID, RACH initial power, PUSCH power, PUCCH power) are known at the coarse level and during the connection, LTE power control instructions could actually bring finer level of power transmission with TPC bits.

Such devices (Category-1) are expected to be attached with the cell 104 and always needs the periodic resources from the cell 104. Hence, with initial connection, the SPS resources can be scheduled with the cell 104. The cell 104 can be configured to schedule such devices (MO device, MTC device 102) with defined SPS interval. The SPS scheduling can be configured to manage the SPS allocation for various SPS interval based mechanism (shown in the FIGS. 5a-5b) followed by contention based RACH (as per the 3GPP).

The MTC device 102/MO devices once attached to the cell 104, can be scheduled based on the SPS scheduling, since all MTC-MO only devices has a common nature of the periodic reporting. So the MO devices can be scheduled based on the SPS basis for a given scheduling interval and for the group of the MO devices thereof.

There is a possibility, where, the multiple resources could be under-utilized in case, if, in the group, a subset of the MO devices didn't use the allocated resources due to their periodicity. So the proposed method could be extended with the M-SPS-PDCCH on the top of SPS resources to schedule the subset of the group of the MO devices (as shown in the FIG. 5B).

Moreover, the MO devices can share its type of devices, Traffic class, delay tolerance, type of data. The cell 104 can be configured to drive the SPS interval based on the above given parameters.

In case, of context specific cell search the MTC device 102 can save the TA, the power head room reporting, the RACH power, the PUSCH power, the PUCCH power. Further, since there is no need to send SR, ACK/NACK, CQI, and feedback due to SPS allocation, hence the MTC device 102 can be configured to disable the PUCCH or UL control channel during the MO only UL data transfer. Consequently, during a radio bearer reconfiguration, there is no need to allocate the PUCCH channel.

Further, the signaling radio bearer can be established in DL/UL to carry L1/L2/L3 control signaling related to attach and detach Bearer configuration and security related signaling. Further, the MTC device 102 can remain in semi connected state with the SPS allocation until detach. Furthermore, the cell 104 should keep the resources allocated for MO only devices in the SPS manner.

However, as soon as the MTC device 102 changes the cell 104, the MTC device 102 needs to trigger a random accesses procedure, and since context-based resource, allocation will fail.

In an embodiment, the proposed mechanism includes distributing the MO only devices in time domain such that the MO only devices can be scheduled across the frames and sub-frames. This would distribute the impact of resource allocation. At every frame or sub-frames there could be possibility, where, big number of the SPS resources is allocated. Hence, the M-SPS-PDCCH can be multiplexed on the SPS resources in order to index, all the MO devices that can be scheduled in this frame/sub-frame from the allocated groups.

The MTC device 102/MO device with various delay tolerance can be allocated with respective SPS scheduling interval. Each MO device in each group can share the reporting interval equally to scheduling instance or integer multiples of scheduling instances.

In an embodiment, the delay tolerance requirement for the set of MO devices can be scheduled in the same SPS interval. For e.g., Group 1 consisting one or more MO devices, wherein each MO device from the group can be configured to receive the resources, scheduled in the same SPS interval as other MO devices in the same group. Similarly various delay tolerance requirement for respective set of MO devices can be scheduled, since the SPS scheduling requires the UL connectivity always, in that case, UL sync related operation can be scheduled.

Unlike the conventional systems and methods, where the SPS scheduling may only involve VoLTE type data communication; transferring the data packets during the interval (time-interval) scheduled by the SPS, the proposed mechanism introduces the M-SPS-PDCCH scheduling for the MTC devices.

Unlike the conventional systems and methods, where the SPS scheduling, for e.g., in the VoLTE type data communication, range, time interval, was limited (few seconds), the proposed mechanism provides the range of the M-SPS-PDCCH for MTC device for few hours.

In an embodiment, other class of MO devices, Category-2, can be defined as emergency services, where, the communication is expected to be highly reliable and with minimum latency.

In an embodiment, in case of the network aware scenario by the MTC device 102: the Radio logical link entity can be established, by the MTC device 102, for the emergency service. Thus, this Radio logical link entity would be made aware of the emergency nature of the service, and it would set additional bit in the protocol identifier to indicate to NW (in the Scheduling Request or in BSR, as detailed in conjunction with FIG. 8) that the resource allocation request is for emergency services.

Thus, the cell 104 (or, the M-SPS-PDCCH) can be configured to allocate the UL resources with maximum redundancy and minimum modulation with additional frequency, time diversity (or Coordinated multipoint Transmission resources) at the MTC device 102 side (keeping error rate above certain thresh hold).

In an embodiment, in case of the network Un-aware scenario, the MTC device 102 can be configured to minimize the Sounding reference signal (SRS) power, in order to mimic the path loss, which could have generated otherwise (for e.g., dummy data shown in FIG. 5B). This would eventually force scheduler to provide resources with maximum protection and minimum modulation with additional time and frequency diversity (transmission modes), detailed in conjunction with the FIG. 8.

FIG. 6 is a sequence diagram depicting various signaling messages between the MTC device 102 and the cell 102 for context aware scheduling of resources, according to an embodiment as disclosed herein. Initially, when the MTC device 102 transition to the connected mode from the Ultra-Deep-Sleep-Mode, the MTC device 102 triggers random access RACH (602) message to the cell 104, basically the RACH preambles. The cell 104 thereupon, in response to the received RACH preambles, can be configured to allocate the resources to the UL centric/the MTC device 102 thereon transmits the Activation frame no: Radio Bearer reconfiguration (604) message to the MTC device 102.

Thus, the resource allocation can be periodic scheduled based on the M-SPS-PDCCH scheduling (606) whereupon the MTC device 102/each MO device in the aforementioned group can be configured to transmit the UL data in the scheduled interval. If the MTC device 102 determines (608) that the UL transmission is running (without failure) then the allocation of the resources can be based on the M-SPS-PDCCH scheduling.

The cell 104, on the other hand can be configured to receive ongoing training (610) to develop the context database 103 for the MO device (610). If the MTC device 102/UL centric device in response to determining (608) the UL transmission failure thereof transmits the signaling message (612) to the cell 102, the signaling message including the update regarding the transmission mode failure (OFF) and thereby switch back to the normal scheduling operation (SPS as in the VoLTE).

The MTC device 102 can be configured to perform the ongoing search (614) for matching the context from the context database 103. Thus, in response to determining that the matching context found (cell found) the MTC therefore re-establish the RACH preambles in order to camp on to the matched cell (to get in to the connected mode).

If the MTC device 102 determines, that no matching cell is found, thereon the MTC device 102 can be configured to perform (618) the 3GPP cell search procedure.

The various steps in the sequence diagram may be performed in the order presented, in a different order or simultaneously. Further, in some embodiments, some of the steps may be omitted, added, modified, skipped, or the like without departing from the scope of the invention.

FIG. 7 is a sequence diagram depicting various signaling messages between the MTC device 102 and one or more cells for context aware scheduling of resources, according to an embodiment as disclosed herein, according to an embodiment as disclosed herein. At first, when the MTC device 102 transmits the UL data as per the M-SPS-PDCCH scheduling interval (702) to the cell 102. The MTC device 102 can request to suspend scheduling (704) for one or more reasons, such as in the low battery condition of the MTC device 102, user if the MTC device 102 doesn't require the need of the MTC device 102 for time being (voluntary turns-off), or the like. The request can be transmitted (706) in the PUCCH-1 bit suspend to the cell 104 notifying to stop allocating the resources.

The MTC device 102 again requests (708) to resume scheduling of the resources for transmitting the UL data to the cell 104 and the cell 106. The request can be transmitted (710) in the PUCCH-1 bit resume to the cell 104 and the cell 106.

The MTC device 102 can explore the context database 103 for camping on to the cell (cell 104/cell 106) available in the context database 103. Thus, the M-SPS-PDCCH scheduling other than identified cell (712) can be used for allocating the resources to the MTC device 102.

Any one of the cell 106) (714) can receive the resume indication in response to the resume request from the MTC device 102. Thus, the MTC device 102 can resume the UL data transmission as per the M-SPS-PDCCH scheduled SPS interval.

Further, the MTC device 102 can be configured to enable the scheduling of the resources for a predefined threshold period of the timer (T). The request to suspend scheduling (718) type allocating of the resources for the "T" period. The request is signaled through the PUCCH-1 bit suspend (720) to the cell 104.

Once the timer exceeds the predefined threshold period (Timer expires) (722) the MTC device 102 can be configured to schedule, M-SPS-PDCCH scheduling (724). Based on the MTC device 102 response only the cell 104 (726) can schedule the allocation of resources, for e.g., based on the M-SPS-PDCCH or for example like sending resource request through existing 3GPP protocol.

The MTC device 102 determines (728) that the UL transmission is ongoing (NO failure indication detected) the MTC device 102 can be configured to continue the transmission of the UL data as per the M-SPS-PDCCH scheduling.

If the MTC device 102 determines (728) that the UL transmission is failed, thereon the MTC device 102 optionally (730) sends a signaling request to the cell 104 indicating transmission mode OFF and switch back to normal scheduling for example like sending resource request through existing 3GPP protocol.

The MTC device 102 can be configured to perform the ongoing search (732) for matching the context from the context database 103. Thus, in response to determining that the matching context found (734) (cell found) the MTC device 102 therefore transmits the UL data as per the M-SPS-PDCCH scheduling.

If the MTC device 102 determines, that no matching cell is found, thereon the MTC device 102 can be configured to perform (736) the 3GPP SPS scheduling procedure.

The various steps in the sequence diagram may be performed in the order presented, in a different order or simultaneously. Further, in some embodiments, some of the steps may be omitted, added, modified, skipped, or the like without departing from the scope of the invention.

The FIG. 8 is a sequence diagram depicting various signaling messages between the MTC device 102 and the cell 104 for handling emergency conditions, according to an embodiment as disclosed herein. Once the sensor unit, associated with the MTC device 102, detects the emergency services occurrence, the MTC device 102 can transmit the RACH triggered (802) with dedicated, emergency, preamble to the cell 104.

Network aware: The cell 104 upon receiving the dedicated, emergency, preamble from the MTC device 102 can thereof optimize the resource allocation (for the group of the MO devices) by granting (804) the best resource allocation available. The transmission mode can be set with the UL TX diversity, least code rate and Min Modulation.

The MTC device 102 can estimate the SRS status of the UL channel and can transmit the status of the channel (806) to the cell 104. The MTC device 102 can set additional bit in the network protocol to inform (808) the network in the scheduling request/in BSR (Buffer Status Report), that resource allocation are expected for the emergency services.

Thus, as the in the network aware, the cell 104 (810) allocates the grants (resources) with best resources to the MTC device 102.

Network un-aware: After the MTC device 102, transmit the SRS (UL channel estimation report) (812), the cell 104 minimizes/attenuates (814) the SRS in order to mimic the path loss, which could have generated otherwise, which eventually force scheduler to provide grant with best resource allocation (816), with best grant, with maximum protection and minimum modulation with additional time and frequency.

The various steps in the sequence diagram may be performed in the order presented, in a different order or simultaneously. Further, in some embodiments, some of the steps may be omitted, added, modified, skipped, or the like without departing from the scope of the invention.

Figure 9:
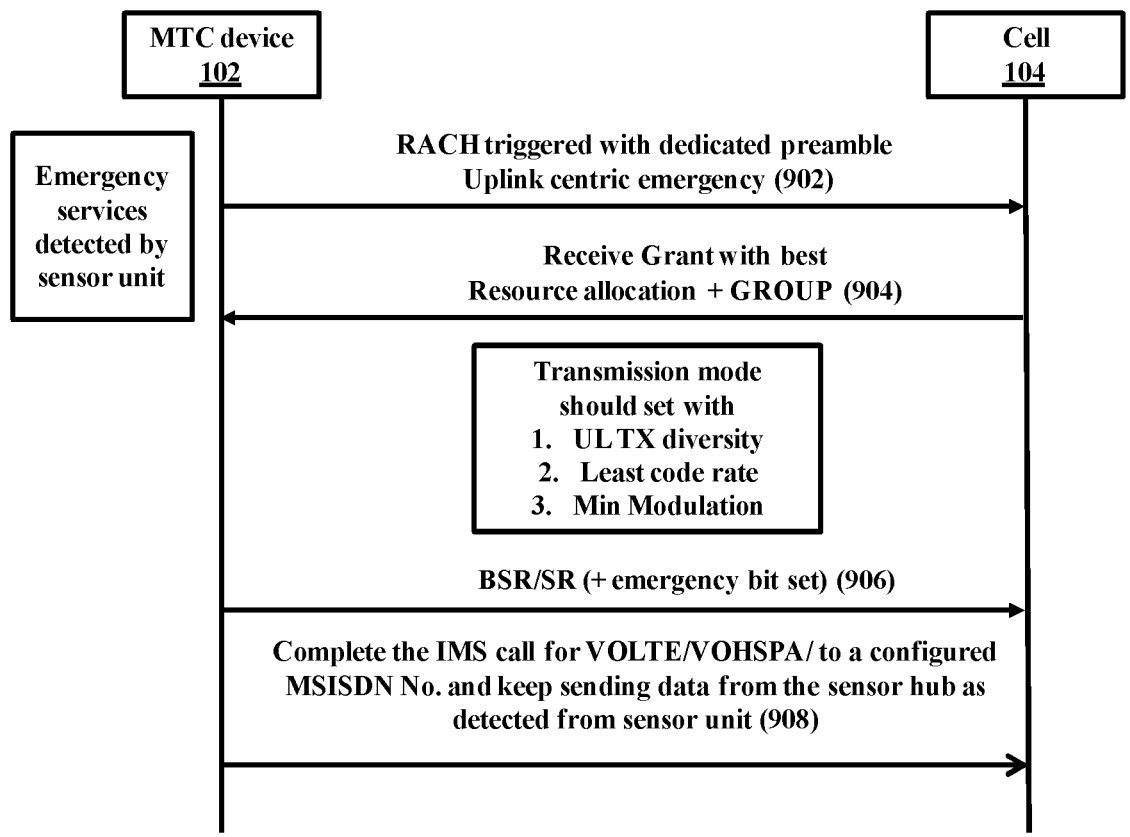
FIG. 9 is a sequence diagram depicting various signaling messages between a MTC device and a cell for handling emergency condition, according to an embodiment as disclosed herein.

FIG. 9 is a sequence diagram depicting various signaling messages between the MTC device 102 and the cell 104 for handling emergency condition, according to an embodiment as disclosed herein. As captured in the use cases, the emergency is directed to particular person(s) and not to the operator's emergency center, thus MO-only call will also connect with pre-configured MSISDN's and MO-only device can keep sending data collected from the sensor unit periodically. During initial attach procedure, the MTC device 102 can be provisioned with the MSISDN's numbers to which it would be allowed to make emergency call.

The MTC device 102 can transmit the RACH triggered (902) with dedicated, emergency, preamble to the cell 104. The cell 104 upon receiving the dedicated emergency preamble from the MTC device 102 can thereof optimize the resource allocation (for the group of the MO devices) by granting (904) the best resource allocation available. The transmission mode can be set with the UL TX diversity, least code rate and Min Modulation.

The MTC device 102 can set additional bit in the network protocol to inform (906) the network in the scheduling request/in BSR (Buffer Status Report), that resource allocation are expected for the emergency services.

The MTC device 102 thus complete (908) the IMS call for VOLTE/VOHSPA/to a configured MSISDN number and keep sending data from the sensor unit.

The various steps in the sequence diagram may be performed in the order presented, in a different order or simultaneously. Further, in some embodiments, some of the steps may be omitted, added, modified, skipped, or the like without departing from the scope of the invention.

The embodiments disclosed herein can be implemented through at least one software program running on at least one hardware device and performing network management functions to control the elements. The elements shown in the FIGS. 1 through 9 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of a terminal device, the method comprising:
   performing a cell search in based on a context database, the context database including temporal parameters, location parameters and network parameters;
   identifying a first cell corresponding to the network parameters in the context database based on the cell search; and
   performing a connected mode procedure with the identified first cell.

2. The method of claim 1, wherein the method further comprises:
   synchronizing with a second cell other than the identified first cell;
   registering with the second cell; and
   transitioning to a connected mode.

3. The method of claim 2, wherein the method further comprises sharing context ID, associated with the temporal parameters, the location parameters and the network parameters, present in the context database to the second cell.

4. The method of claim 3, further comprising:
   determining a suspend state; and
   indicating the suspend state to the identified first cell, wherein the suspend state suspends allocation of resources for the terminal device.

5. The method of claim 4, further comprising:
   determining a resume state;
   determining a current cell where the terminal device has to resume;
   indicating the resume state to the current cell, wherein the current cell is other than the identified first cell where the terminal device suspended, wherein the context database is available with all cells present in the context database through internal network message exchange; and
   receiving the resources from the current cell.

6. The method of claim 5, wherein the resume state is indicated implicitly when a timer is expired and a value of the timer was indicated in the suspend state to the identified first cell.

7. The method of claim 2, wherein the method further comprises:
   joining a group generated by the identified first cell for scheduling uplink (UL) data;
   identifying resources allocated for the terminal device within the group; and
   transmitting UL data to the identified first cell in the identified resources.

8. The method of claim 7, wherein transmitting the UL data to the identified first cell includes:
   estimating a downlink (DL) channel compensation; and
   transmitting the UL data when the estimated DL channel compensation exceeds a predefined threshold.

9. The method of claim 8, wherein the method further comprises:
   dynamically updating the context database in response to determining that transmission of the UL data failed; and
   determining a cell other than the identified first cell for synchronization.

10. The method of claim 1, wherein the network parameters comprises a public land mobile network (PLMN), a Radio Access Technology (RAT), a Timing Alignment (TA), a Uplink (UL) Transmission (Tx) Power, a Physical Uplink Shared Channel (PUSCH) power and a Physical Uplink Control Channel (PUCCH) power.

11. A terminal device, the terminal device comprising:
   a transceiver configured to communicate with at least one entity; and
   a processor configured to:
     perform a cell search in based on a context database, the context database including temporal parameters, location parameters and network parameters,
     identify a first cell corresponding to the network parameters in the context database based on the cell search, and
     perform a connected mode procedure with the identified first cell.

12. The terminal device of claim 11, wherein the processor further configured to:
   synchronize with a second cell other than the identified first cell;
   register with the second cell; and
   transition to a connected mode.

13. The terminal device of claim 12, wherein the processor further configured to share context ID, associated with the temporal parameters, the location parameters and the network parameters, present in the context database to the second cell.

14. The terminal device of claim 13, wherein the processor further configured to:
   determine a suspend state; and
   indicate the suspend state to the identified first cell, wherein the suspend state suspends allocation of resources for the terminal device.

15. The terminal device of claim 14, wherein the processor further configured to:
   determine a resume state;
   determine a current cell where terminal device has to resume;
   indicate the resume state to the current cell, wherein the current cell is other than the identified first cell where the terminal device suspended, wherein the context database is available with all cells present in the context database through internal network message exchange; and
   control the transceiver to receive the resources from the current cell.

16. The terminal device of claim 15, wherein the resume state is indicated implicitly when a timer is expired and a value of the timer was indicated in the suspend state to the identified first cell.

17. The terminal device of claim 12, wherein the processor further configured to:
   join a group generated by the identified first cell for scheduling uplink (UL) data;
   identify resources allocated for the terminal device within the group; and
   control to the transceiver to transmit UL data to the identified first cell in the identified resources.

18. The terminal device of claim 17, wherein, in transmission of the UL data to the identified first cell, the processor configured to:
   estimate a downlink (DL) channel compensation; and
   control to the transceiver to transmit the UL data when the estimated DL channel compensation exceeds a predefined threshold.

19. The terminal device of claim 17, wherein the processor further configured to:
   dynamically update the context database if the UL data transmission is failed; and
   determine a cell other than the identified first cell for synchronization.

20. The terminal device of claim 11, wherein the network parameters comprises a public land mobile network (PLMN), a Radio Access Technology (RAT), a Timing Alignment (TA), a Uplink (UL) Transmission (Tx) Power, a Physical Uplink Shared Channel (PUSCH) power and a Physical Uplink Control Channel (PUCCH) power.

\* \* \* \* \*